March 16, 1954  N. H. SPEAR  2,672,047
HIGH-TEMPERATURE VISCOMETER
Filed March 31, 1950
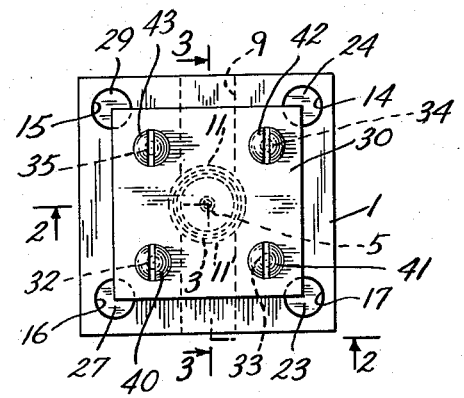
FIG. I.
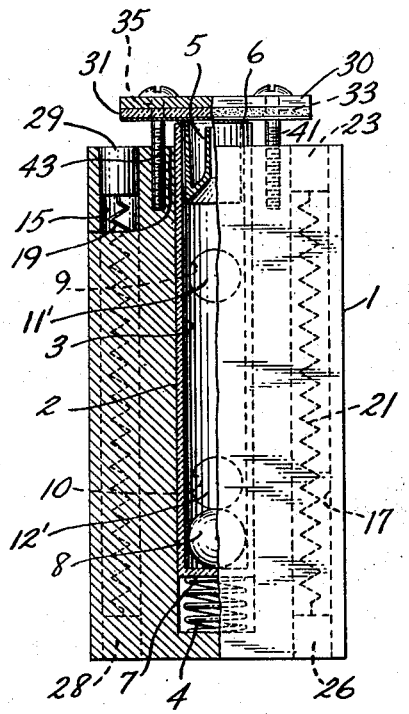
FIG. 2.
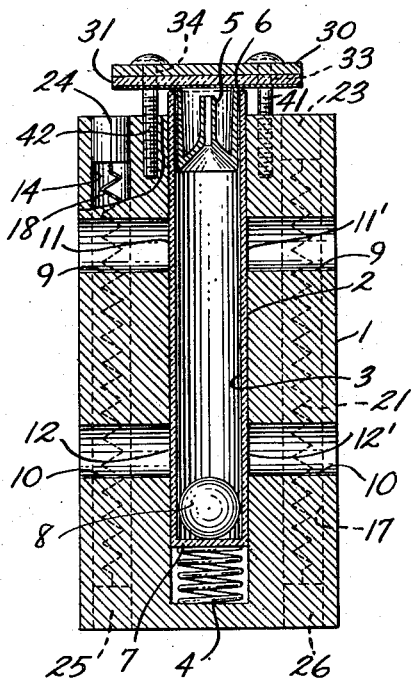
FIG. 3.
INVENTOR
NORMAN HEYN SPEAR
BY Campbell, Brumbaugh, Free and Graves
his ATTORNEYS Patented Mar. 16, 1954

2,672,047

UNITED STATES PATENT OFFICE 2,672,047

HIGH-TEMPERATURE VISCOMETER

Norman H. Spear, Hamden, Conn., assignor to John B. Pierce Foundation, New York, N. Y., a corporation of New York Application March 31, 1950, Serial No. 153,067

8 Claims. (Cl. 73—57)

This invention relates to viscometers of the falling ball type especially designed for operation at high temperatures.

In the development of fluids for use in heat transfer equipment and in hydraulic systems, and in the design of petroleum refining equipment for operation at elevated temperatures, it becomes necessary to determine accurately the viscosity of such liquids at such temperatures. Unfortunately, however, very few devices are available which are capable of measuring viscosities at elevated temperatures, particularly in excess of 200° C. Most data at such temperatures has been determined, not by experiment, but by calculation, estimation or extrapolation of viscosity-temperature curves plotted from values obtained at lower temperatures. Such methods are obviously unreliable since liquids may show eccentric viscosity changes at elevated temperatures.

Such eccentricities should, of course, be determinable in advance of use of the liquid.

A survey of technical publications has revealed only two papers on the measurement of high temperature viscosities. A number of papers describe work at high temperatures but are inapplicable in the present situation since they consider temperatures of 80° C. as "high." A paper by Watson, Wien and Murphy, Industrial and Engineering Chemistry, volume 28, pages 605 to 609 (1936), describes a method which is useful only on a commercial scale and as a basis for comparison of data. A second publication by Murphy, Romans and Zisman, Transactions of the ASME, July 1949, pages 561 to 574, describes apparatus for measuring viscosities by the capillary method. The disadvantages of this method will be seen hereinafter.

One of the contributory reasons for lack of material in this field is the lack of a high temperature viscosity standard. The National Bureau of Standards supplies viscosity standards only up to 38° C. This is undoubtedly a reflection of the extreme difficulties encountered in measuring viscosities at higher temperatures.

There are three basic methods for measuring the viscosity of liquids. The rotational method consists in either measuring the torsional drag of a cylindrical body rotating at constant speed, or in measuring the speed of a cylindrical body rotating under constant torsional force, the cylindrical body in each case being immersed in the liquid being tested and the viscosity being computed by mathematical formulae. The efflux timing method, otherwise called the tube or capillary method, consists in timing the flow of a given volume or mass of the liquid through an aperture or orifice whose dimensions are known. The viscosity is then computed using the Hagen-Poiseuille law of laminar flow in a tube. The falling ball method consists in timing the fall of a sphere through a given distance in the liquid to be tested under gravitational forces. The viscosity is then computed using Stokes' law.

Rotational methods are difficult to apply because they require relatively large volumes of liquid, and it is necessary to rely upon special cylindrical bodies for the upper ranges of viscosity and temperature, with resulting difficulties in measuring the viscosity accurately. Moreover, apparatus of this type available is designed for use only at low temperatures, and its redesign and recalibration for use at higher temperatures is a lengthy procedure. So likewise the efflux timing methods require special complicated equipment or calibration by a non-existent standard at high temperatures. Moreover, complex corrections must be employed in calculating the viscosities, as is discussed in the Murphy et al., paper referred to above.

Accordingly, it is an object of the present invention to design a viscometer relatively simple in construction and operation for operation at elevated temperatures.

Further, it is an object of the invention to construct apparatus for measuring viscosity by adaptation of the falling ball or sphere principle at elevated temperatures.

The apparatus of the invention comprises essentially a high temperature transparent tube closed at one end, a heating body enclosing said tube and capable of maintaining said tube at temperatures in excess of 200° C. up to about 550° C., a sphere of smaller diameter than said tube and adapted to pass through fluid contained in said tube, and viewing means for observing the passage of said sphere in the transparent tube.

Fig. 1 is a top plan view of one embodiment of apparatus of the invention;

Fig. 2 is a front view partly in section, taken along the lines 2—2 of Fig. 1; and Fig. 3 is a side cross sectional view taken along the lines 3—3 of Fig. 1.

Like numbers refer to like parts in each of the figures.

Reference numeral 1 represents a rectangular solid metal heating block, preferably formed of brass but suitably also of lead, steel, or like metal of high heating capacity. Centrally located in the block is a recess 2, in which is disposed a transparent tube 3 formed of a material capable of withstanding temperatures at which the apparatus is to be employed, for example, temperatures from 200 to 550° C., for example, quartz, or glass, such as "Vycor" or "Pyrex." The tube is supported upon the compression spring 4 at the bottom of the recess 2. When a soft metal such as lead is used as the block, a liner of brass or steel may be placed in the recess 2. A bubble catcher 5 is fitted in the mouth of the tube, and held therein by outwardly projecting deformations 6 in its wall which slightly overlap the end of the tube 3. The outside diameter of the bubble catcher must not exceed the inside diameter of the tube at the highest temperature at which the device is to be used.

The tube 3 is transparent, although opaque tubes with transparent windows may be used, and is closed at its lower end 7.

The sphere 8 which is to fall through liquid in the tube 3 is shown resting upon the bottom of the tube. The sphere should be transparent or translucent, but may be opaque if desired. The ratio of sphere to tube diameter $(d/D)$ should be less than 1, but preferably not less than 0.8. A suitable tube, for example, is 15 inches long and 1.59 cm. in diameter, and has a capacity of 76 cc., while a suitable sphere for such a tube has a diameter of 1.27 to 1.58 cm. and weighs approximately 2.44 to 13.02 grams. For greater accuracy, the tube should be of precision bore, and both tube and sphere should be of the same material, preferably glass, or of materials having essentially the same coefficients of linear expansion. The block 1 is pierced by two horizontal passages 9 and 10 which pass through the recess 2 at right angles thereto, and serve as windows for viewing the transparent tube at 11, 11' and 12, 12'.

There are four vertical passages, 14, 15, 16 and 17, at the corners of the block. Disposed in these passages are heating elements 18, 19, 20 (not shown) and 21. The heating elements are connected at each of their ends to electrical outlets 23, 24, 25, 26, 27, 28 and 29. The heaters are made of Nichrome ribbon (nickel alloy) wound on porcelain mandrels and insulated, and preferably should be connected in series in order to provide a uniform temperature. To accurately determine the temperature of liquid contained in the tube, thermocouples may be provided, which project into the tube at either end thereof, outside the testing area, i. e., above and below the viewing windows. A "Variac" regulator (not shown) may be employed to provide temperature control by control of the heater current.

The tube is held securely in place in the recess and is made leakproof by the bearing plate assembly. This comprises a bearing plate 30 and a gasket 31 made of thin copper sheet backed by asbestos. Each of these members is pierced by four holes 32, 33, 34 and 35, in alignment with each other. Both members are held in place against the mouth of the tube 3 by four tension screws 40, 41, 42 and 43, which thread into sockets in the face of the block 1. The tube is held firmly against the inner face of the gasket by the compression spring 4, biased against the lower end of the tube in the recess 2.

The block 1 if desired may be secured to a swivel and bolted to a wall so that it may be arranged at any angle to the horizontal, preferably with a source of light behind the viewing windows. Also, the block may be insulated, for example, by wrapping it in asbestos pipe insulation, to prevent heat loss to the atmosphere during use. Lights may be provided at one side of the block 1 opposite the viewing windows so as to illuminate the falling ball to the eye of the observer at the opposite side on the block. For accuracy in measurement it is preferable that the windows be cylindrical and that the diameter of the sphere be larger than the diameter of the viewing windows, so that the sphere eclipses the viewing passages 9 and 10, at least momentarily, during its fall downwardly through the tube. This creates an easily detectable point from and to which to measure the distance and time of fall.

The operation of the apparatus is as follows: A liquid whose viscosity is to be measured and the ball adapted to fall through a liquid disposed in the tube are placed together in the tube such that the tube is completely full of liquid and no air bubbles are present. The heating elements in the block are then turned on and the current therethrough adjusted until the temperature of the liquid has become constant at the desired level, and expansion thereof with temperature has ceased. The temperature may be determined by hand, using a thermometer or thermocouple placed in the liquid, or, preferably, by a thermocouple-thermostat system permanently fixed in the tube and made a part of the electric heating system. For accurate measurement of viscosity the temperature should be uniform throughout the tube; agitation of the liquid by movement of the sphere is suitable to overcome stratification therein.

The bearing plate and gasket are then placed in position and secured to the block against the pressure of the spring by the tension screws. The block is now inverted so as to cause the ball to fall or roll to the top of the tube against the inner face of the bubble-catcher and then set upright at an angle to the horizontal, say approximately 40° (the angle chosen may vary to 90°, depending upon the temperature and the viscosity of the liquid being tested), and the time required for the ball to fall or roll along the tube to the lower window noted. This time may be measured in each case from the instant at which light can be seen only through the sphere, that is, the instant at which the sphere eclipses the passage, so that all light is transmitted through the transparent or translucent ball (or not transmitted at all if the ball is opaque). The block is then inverted and the ball allowed to fall in the opposite direction through the tube and the time required for the ball to fall from the higher to the lower window again noted. The temperature of the liquid is checked before and after the test. The specific gravity of the liquid being known, the viscosity is expressed by the following equation:

$$u = \frac{5\pi}{42} K (S_b - S_l) t d \frac{(d+D)}{L} g \sin \theta$$

where $u$ = viscosity (centipoises)
$K$ = apparatus constant
$S_b$ = specific gravity of sphere (cgs.)
$S_l$ = specific gravity of liquid (cgs.)
$t$ = time of sphere descent (seconds) (taken as the average of at least two falls)
$d$ = diameter of sphere (cm.)
$D$ = diameter of tube (cm.)
$L$ = length of sphere descent (cm.)
$g$ = gravitational constant (cm./sec.$^2$)
$\theta$ = angle of inclination of tube K, the apparatus constant, is dimensionless and is calculated at room temperature against a viscosity standard. It is constant with respect to temperature and all the other variables in the equation. Other values for the variables of the equation are computed for the mean temperature of the test.

The quantity $d(d+D)/L$ has been found to vary less than 0.2% if the tube and sphere are of the same material and the ratio of $d/D$ is greater than 0.95. Thus, the above equation may be simplified to the following form:

$$u = C(S_b - S_l) t \sin \theta$$

where C is a constant which may be used on a commercial or scientific scale if $\theta$ is such that $t/L$ is greater than 3, thereby eliminating turbulent motion or skipping of the sphere within the tube.

It will be seen that the viscometer in accordance with the invention is simple in construction and requires only small volumes of test liquids. The measurement of viscosity using the apparatus is also simple; the only physical property of the test liquid which need be known is its specific gravity. Temperature equilibrium is easy to establish and maintain.

The timing of the fall may be made visually. Also, photoelectric tubes may be used and the breaks in the circuit as the ball crosses each passage recorded electrically on a graph, or caused to ring a bell, the time elapsing between rings being noted by an observer.

The heating block shown is rectangular, but obviously it may be cylindrical or take other shapes.

When the ratio of the diameters of the sphere and the tube $(d/D)$ is less than 1 but not less than 0.8, and the tube and sphere are formed of materials of essentially the same coefficient of linear expansion, certain particular advantages are obtained. Since the film between the tube wall and the sphere in such cases is exceedingly thin (of the order of 0.005 inch), the apparatus may be used with relatively opaque as well as translucent liquids because back illumination of the viewing ports makes travel of the sphere through such a thin layer of most opaque liquids readily visible. Moreover, errors resulting from the turbulence caused by relatively high sphere velocities are eliminated, particularly in the case of low viscosity fluids, for the rate of flow of fluid between sphere and tube is greatly slowed because of the narrow space therebetween.

If the tube and sphere are of the same material or of materials having like coefficients of linear expansion, the ratio of $d/D$ does not change appreciably with temperature and, therefore, the apparatus may be calibrated at room temperatures for use at high temperatures. This is very important since viscosity standards are not available for temperatures over 38° C.

The apparatus will not only give reliable viscosity determinations after calibration with appropriate standards, but it is also adapted to the measurement of absolute viscosities if the correlation factor K is determined as a function of $d/D$.

It will be understood that various other changes may be made within the scope of the invention without changing the spirit thereof, and that the invention is not to be limited except in accordance with the appended claims.

I claim:

1. A viscometer of the falling ball type for operation at high temperatures, comprising a transparent tube, a sphere adapted to pass through fluid contained in the tube, a solid heating body of high heat capacity surrounding said tube for heating the same to elevated temperatures, said body having formed therein a passage communicating with the transparent tube between the ends of the tube to permit observation of the passage of the sphere through the tube.

2. A viscometer in accordance with claim 1 in which both the tube and sphere are formed of the same glass.

3. A viscometer in accordance with claim 1, including spring-actuated means for sealing the tube, comprising spring means reacting between the tube and the heating body for urging the tube in an axial direction, and a bearing plate mounted on said body and adapted to be engaged by the end of said tube to counteract the force of the spring means and to cause the tube to be sealed by the bearing plate, whereby a determination may be carried out without loss of volatile fluids.

4. A viscometer in accordance with claim 1 in which the ratio of sphere diameter to tube diameter $(d/D)$, is not less than 0.8.

5. A viscometer in accordance with claim 6 in which the passage in said block is cylindrical in cross section and the diameter of the sphere is larger than the diameter of the passage.

6. A viscometer of the falling ball type of operation at high temperatures, comprising a solid heating body in the form of a metal block of high heat capacity, said metal block being formed with a recess, a transparent tube received in the recess, electric heating means fitted in said block, and a sphere adapted to pass through fluid contained in the tube, said block being formed with a passage connecting a face of the block with the transparent tube between the ends of the tube and presenting an opening in another face of the block for ingress of illumination, thereby to permit observation of the passage of the sphere through the tube.

7. A viscometer in accordance with claim 6, including spring means reacting between said block and said tube, a bearing plate for sealing the mouth of the tube against loss of fluid therefrom, and means for securing the bearing plate to the block, whereby the spring means urges the tube against said bearing plate.

8. A viscometer in accordance with claim 6, including means for sealing the mouth of the tube against loss of fluid therefrom, comprising a bearing plate and gasket, a spring disposed in the recess beneath and biased against the tube to force the same against said bearing plate and gasket, and screw means associated with said bearing plate and gasket for securing the same to the block adjacent the mouth of the tube.

NORMAN H. SPEAR.

References Cited in the file of this patent

UNITED STATES PATENTS

| Number | Name | Date |
| --- | --- | --- |
| 292,532 | Beggs | Jan. 29, 1884 |
| 1,459,262 | Rode | June 19, 1923 |
| 1,894,369 | Duffing | Jan. 17, 1933 |
| 2,259,525 | Landis | Oct. 21, 1941 |
| 2,320,219 | Buckley et al. | May 25, 1943 |

OTHER REFERENCES

McCaffery et al.: Technical Publication No. 383 of the American Institute of Mining and Metallurgical Engineers (1931), p. 28.